(12) United States Patent
Maurischat (10) Patent No.: US 10,612,993 B2
(45) Date of Patent: Apr. 7, 2020

(54) TESTING DEVICE FOR CHECKING THE LEAK TIGHTNESS OF CONTAINERS, AND METHOD THEREFOR

(71) Applicant: Robert Bosch GmbH, Stuttgart (DE)

(72) Inventor: Wolfgang Maurischat, Satteldorf (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 15/747,586

(22) PCT Filed: May 24, 2016

(86) PCT No.: PCT/EP2016/061660
§ 371 (c)(1),
(2) Date: Jan. 25, 2018

(87) PCT Pub. No.: WO2017/016700
PCT Pub. Date: Feb. 2, 2017

(65) Prior Publication Data
US 2018/0209868 A1    Jul. 26, 2018

(30) Foreign Application Priority Data

Jul. 29, 2015  (DE) .................. 10 2015 214 345

(51) Int. Cl.
*G01M 3/32* (2006.01)
*G01M 3/34* (2006.01)

(52) U.S. Cl.
CPC .................... *G01M 3/329* (2013.01)

(58) Field of Classification Search
CPC ........................ G01M 3/00–34; G01M 3/329
See application file for complete search history.

(56) References Cited

U.S. PATENT DOCUMENTS

| 3,813,923 A * | 6/1974 | Pendleton | G01M 3/229 73/49.2 |
| 3,852,995 A * | 12/1974 | Duncanson | G01M 3/226 73/40 |
| 5,753,801 A * | 5/1998 | Cheney | B07C 5/02 73/52 |

(Continued)

FOREIGN PATENT DOCUMENTS

| CN | 102187192 A | 9/2011 |
| CN | 202511948 U | 10/2012 |

(Continued)

OTHER PUBLICATIONS

International Search Report for Application No. PCT/EP2016/061660 dated Sep. 13, 2016 (English Translation, 2 pages).

*Primary Examiner* — Nguyen Q. Ha
(74) *Attorney, Agent, or Firm* — Michael Best & Friedrich LLP (57) ABSTRACT

The invention relates to a testing device for checking the leak tightness of containers (5), comprising a holding unit (3) for holding at least one container (5), which holding unit has a first holding part (31) and a second holding part (32), wherein the holding unit (3) is divided into the first and second holding parts (31, 32) in the direction of a longitudinal axis (L) of the holding unit (3) and wherein a pivot shaft (4) for the pivoting of at least one holding part is arranged on the first and/or second holding part (31, 32).

13 Claims, 6 Drawing Sheets

(56) References Cited

U.S. PATENT DOCUMENTS

| | | | |
|---|---|---|---|
| 5,880,359 A | 3/1999 | Kono et al. | |
| 6,330,823 B1* | 12/2001 | Raymond | G01M 3/3218 |
| | | | 73/41 |
| 2007/0157726 A1* | 7/2007 | Engel | G01M 3/3209 |
| | | | 73/432.1 |
| 2012/0260722 A1* | 10/2012 | McGregor | G01M 3/207 |
| | | | 73/40.7 |
| 2014/0319035 A1* | 10/2014 | Burbank | A61M 1/367 |
| | | | 210/143 |

FOREIGN PATENT DOCUMENTS

| | | |
|---|---|---|
| DE | 69827287 | 10/2005 |
| EP | 209203 | 1/1987 |
| FR | 2193479 | 2/1974 |
| FR | 2762676 | 10/1998 |
| JP | S51142383 A | 12/1976 |
| JP | S5968236 A | 4/1984 |
| JP | H01288514 A | 11/1989 |
| JP | H03255328 A | 11/1991 |
| JP | H075060 Y2 | 2/1995 |
| JP | 2001074587 A | 3/2001 |
| JP | 2004294416 A | 10/2004 |
| JP | 2004296171 A | 10/2004 |
| JP | 2005195439 A | 7/2005 |
| JP | 3138509 U | 1/2008 |
| JP | 2012188158 A | 10/2012 |
| JP | 2013019792 A | 1/2013 |

* cited by examiner

TESTING DEVICE FOR CHECKING THE LEAK TIGHTNESS OF CONTAINERS, AND METHOD THEREFOR

BACKGROUND OF THE INVENTION

The invention relates to a testing device for checking the leak tightness of containers, in particular pharmaceutical containers. The present invention furthermore relates to a method for supplying containers that are to be checked for leak tightness to the testing device.

In the case of pharmaceutical products, a quality check of the container must frequently be carried out with regard to the leak tightness thereof. In so doing, the options for a leak tightness check are possible with excess pressure and with negative pressure (vacuum). To this end, a container filled and closed under normal pressure is placed in a closed chamber, for example under vacuum. A certain length of time has to then elapse and a change in pressure per unit of time is measured in the vacuum range. If the vacuum pressure remains constant, this is a distinguishing characteristic for a leakproof container. If, however, the vacuum pressure increases, this is, if a leakproof chamber can be assumed, a sign for leakage in the container because a measureable pressure equalization between the interior of the container and the vacuum chamber occurs via leaks in the container, e.g. holes or cracks etc. In the case of a leak tightness check using excess pressure, a drop in pressure occurs with a leaking container and the assumption of a leakproof chamber. Said drop in pressure occurs because the pressure medium enters the interior of the container via the crack or something similar and thus a pressure equalization occurs. Generally holding units are divided in such a way that a pot-shaped lower part is present, in which the container to be checked is introduced and subsequently a cover part is placed thereupon. Alternatively, the container can also be placed on a plate and a pot-shaped holding unit is placed on the container. In addition, a holding unit is known from the German patent application DE 69827287 which is divided into a first and second holding part in the direction of a longitudinal axis of the holding unit. The containers are thus inserted into one of the holding parts and the other holding part is subsequently placed thereupon.

The known solutions, however, all have the disadvantage that there is not a fast supply option of the containers into the holding parts nor a fast removal option of the containers out of the holding parts. This is however necessary in order to be able to implement a fast and efficient process sequence.

SUMMARY OF THE INVENTION

The inventive testing device for checking the leak tightness of containers has in contrast the advantage that a significantly improved supply process and removal process of the containers in and out of the testing device are made possible. The containers to be tested can thereby be inserted fast and reliably into a holding unit and be extracted fast and reliably from said holding unit. This is achieved according to the invention in that the testing device has a holding unit for accommodating at least one container, said holding unit comprising a first and second holding part. In so doing, exactly one container can be accommodated or also a plurality of containers can be accommodated in the holding unit. According to the invention, the holding unit is divided into the first and second holding part in the direction of a longitudinal axis of the holding unit. A pivot shaft for pivoting at least one holding part is arranged on the first and/or second holding part. As a result, a fast insertion of containers into and removal of containers from the holding unit are ensured by the first and/or second holding part being pivoted into a corresponding insertion and removal position.

The holding unit is preferably divided in a dividing plane. The dividing plane is particularly preferably arranged inclined at a first angle $\alpha$ to a vertical axis. As a result, an easy insertion and removal of the containers into and out of the holding unit is supported.

In a particularly preferred manner, the first and second holding part are connected to one another on the pivot shaft. A particularly compact and simple construction can thereby be achieved. Furthermore, a captive division of the holding unit can also be facilitated.

In a further preferred manner, the pivot shaft is arranged at a first end region of the holding unit. This allows the holding unit to be completely opened by pivoting a holding part about the pivot axis.

According to a further preferred embodiment of the invention, only precisely one of the two holding parts is pivotably arranged on the pivot shaft.

The testing device furthermore preferably comprises a rondel in which a multiplicity of holding units is arranged. The rondel rotates about a rotational axis. In a particularly preferred manner, the rotational axis is arranged in the vertical direction so that the rotational axis corresponds to the vertical axis to which the dividing plane of the holding unit is disposed at the first angle $\alpha$.

The testing device furthermore preferably has a feed device having a star wheel comprising a conveying plane in which the containers are conveyed, wherein the conveying plane is disposed at a second angle $\beta$ to a horizontal plane. In other words, the conveying plane is provided in such a way that said conveying plane is inclined to the horizontal plane. A particularly simple and secure handling of the containers can thus be implemented during the insertion and removal process. This also enables the containers to be tested to be arranged in different positions relative to the rotational axis during a rotation of the star wheel. A continuous transfer of the containers in the star wheel from an inclined position into a vertical position and back can also be facilitated. The second angle $\beta$ is thereby preferably half as large as the first angle $\alpha$.

According to a preferred embodiment, the testing device furthermore comprises a lifting/pivoting device, which is connected to the second holding part in order to close and to open the holding part. In doing so, the pivot shaft is arranged on the second holding part, and the first holding part is preferably designed relatively immovable with respect to the second holding part. An opening and closing of the holding part thus occurs by a lifting and pivoting movement of the second holding part.

The holding unit furthermore preferably comprises at least one recess for accommodating a container, the recess having a recess longitudinal axis which is parallel to the longitudinal axis of the holding unit. A particularly simple insertion and removal of the containers into and out of the holding unit is thus facilitated.

The present invention furthermore relates to a method for feeding containers to be checked for leak tightness into a testing device having at least one holding unit which comprises a first and a second holding part and which is divided in the direction of the longitudinal axis of the holding unit. The method comprises the steps of feeding the container to the open holding unit and inserting the container in the open holding unit. The first holding part is inclined at an angle to a vertical axis, and the container to be checked is inserted in a position inclined to the vertical axis. A secure and simple insertion can thus be facilitated, wherein the danger of the container falling out of the open holding unit is significantly reduced. Especially when using a rondel, it is significantly more difficult for a container to fall out against the centrifugal force that is present. In a further preferred manner, the container is also removed in the position inclined to the vertical axis.

It should be noted that an individual test of containers as well as a simultaneous testing of a plurality of containers when the holding unit is correspondingly designed to accommodate a plurality of containers is possible by means of the testing device according to the invention and the testing method according to the invention. Pharmaceutical containers are preferably tested.

BRIEF DESCRIPTION OF THE DRAWINGS

Preferred exemplary embodiments of the invention are described below in detail with reference to the accompanying drawings. In the drawings.

DETAILED DESCRIPTION

A testing device 1 according to a first preferred exemplary embodiment of the invention is described below in detail with reference to FIGS. 1 to 5.

Figure 1:
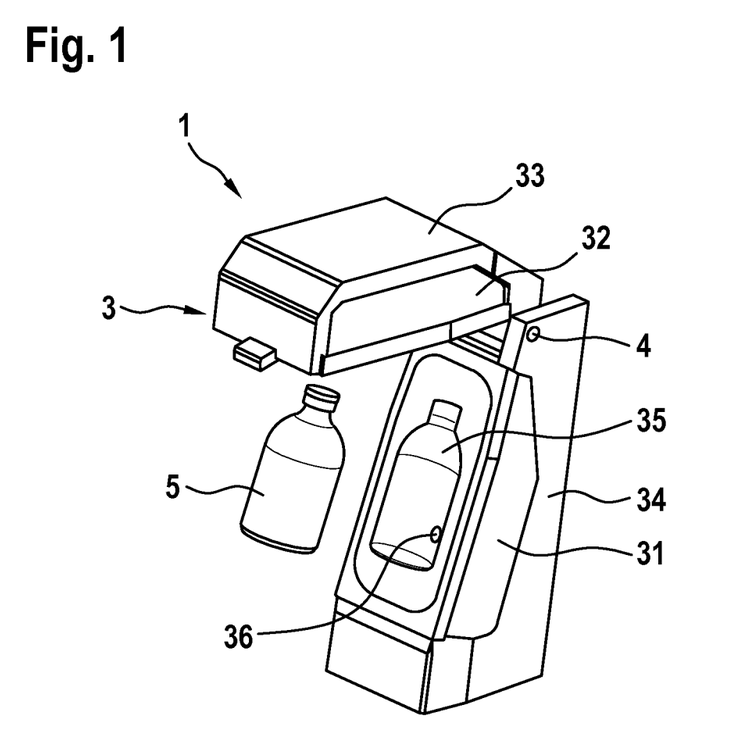
FIG. 1 shows a schematic, perspective depiction of a holding unit of a testing device according to a first exemplary embodiment of the invention.

As can be seen in FIG. 1, the testing device 1 comprises a holding unit 3 which comprises a first holding part 31 and a second holding part 32. A recess 35 is formed in the holding parts 31, 32, said recess corresponding in form substantially to a container 5 to be tested.

The container 5 to be tested in this exemplary embodiment is a pharmaceutical vial. The first and second holding part 31, 32 are arranged in each case in a first housing shell 33 or respectively a second housing shell 34. An exchangeability of the holding parts 31, 32 can thus be provided in the event that another vial form or the like is to be checked for leak tightness.

Figure 4:
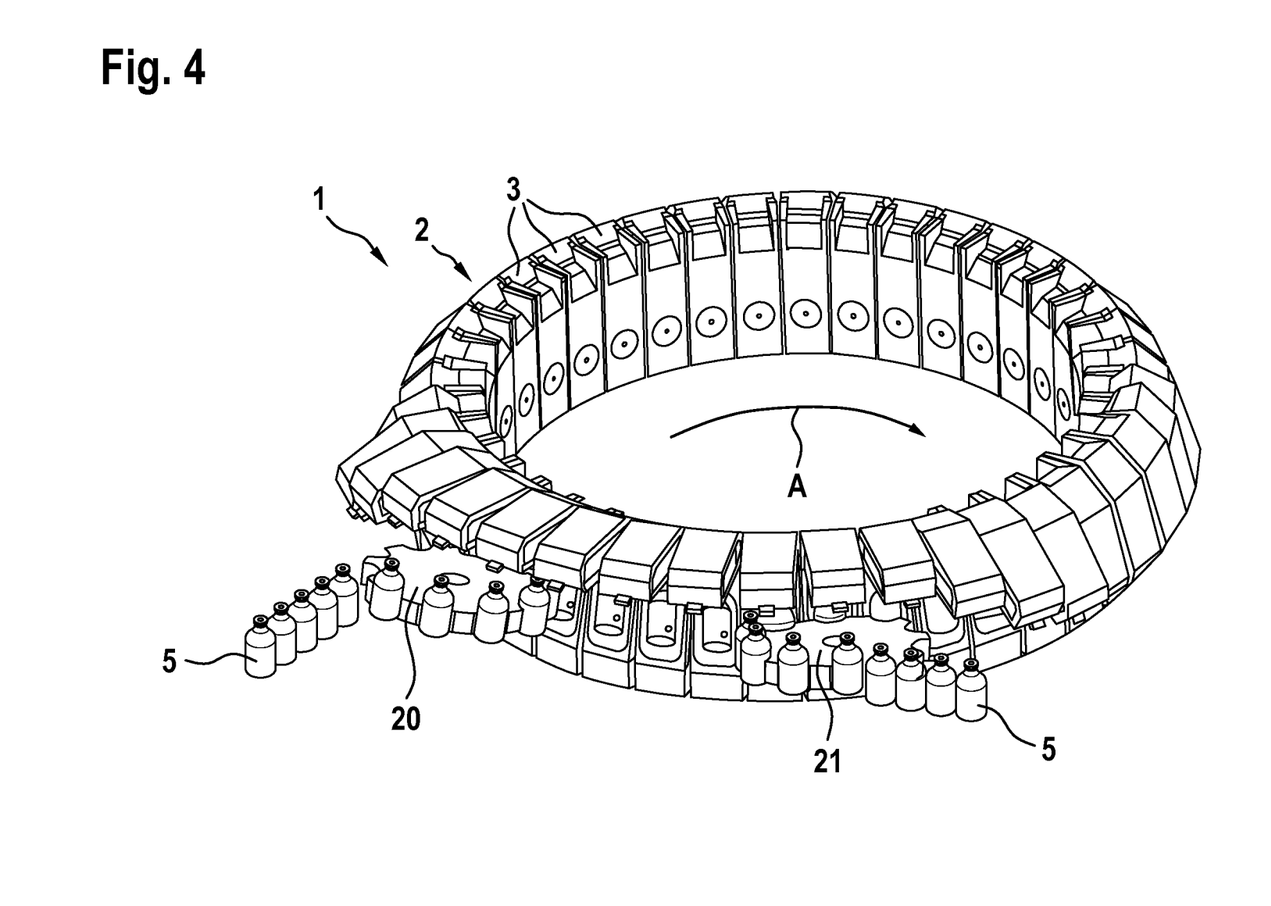
FIG. 4 shows a perspective depiction of a rondel of the testing device of the first exemplary embodiment.
Figure 5:
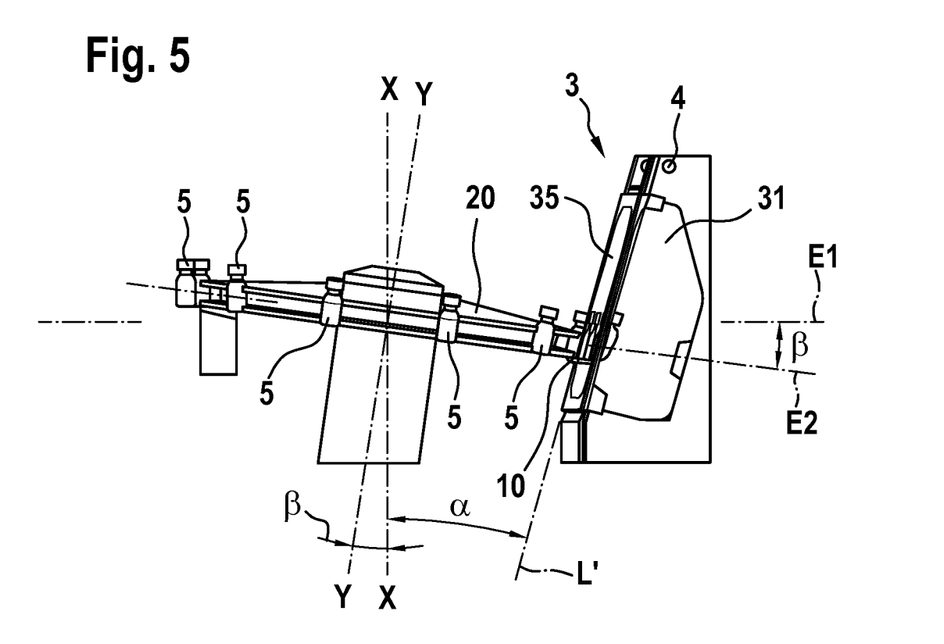
FIG. 5 shows as schematic side view of the testing device of FIG. 1 comprising a feed device.

The overall construction of the testing device 1 can be seen in FIGS. 4 and 5. The testing device 1 comprises a rondel 2, at which a multiplicity of holding units 3 is arranged along the circumference. The rondel 2 is rotated in the direction of arrow A. During the rotation of said rondel, a check of the leak tightness of the containers takes place.

As can particularly be seen in FIG. 4, a feed device 20 comprising a first star wheel and a removal device 21 comprising a second star wheel are further provided at the rondel. The first star wheel of the feed device separates the containers 5 in a known manner and inserts the containers 5 into the open holding unit 3. A well-developed support plate 10 is provided here at the holding unit 3 (cf. FIG. 2), whereby a standing state of the container 5 in the half shell is improved.

Figure 2:
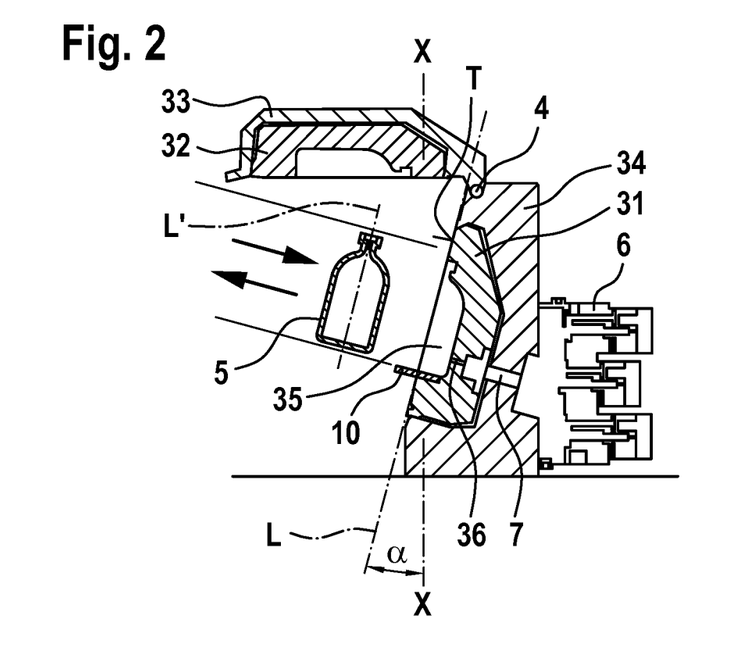
FIGS. 2 and 3 show schematic sectional views of the holding unit of FIG. 1, which illustrate the insertion and removal process as well as the closing process.

The first holding part 31 is connected to the second holding part 32 by means of a pivot shaft 4. The pivot shaft 4 is provided at an upper region of the holding unit 3. The first holding part 31 is not designed to pivot, but only the second holding part 32. FIG. 2 shows the open state and FIG. 3 the closed state of the holding unit 3.

Figure 3:
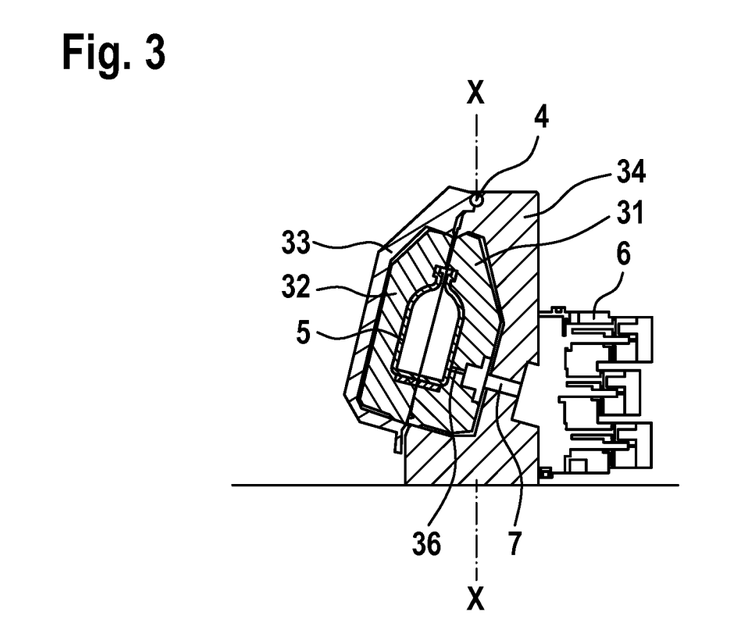

A vacuum connection 36 as well as a level of measurement line 7 for determining a pressure level in the closed holding unit 3 is provided on the non-pivotable first part 31. The reference number 6 denotes a vacuum generation device having valve technology and measuring device.

As can be seen particularly in the FIGS. 2 and 3, the first and second holding part 31, 32 are separated by a dividing plane T. In other words, the holding unit 3 is divided by a plane into two holding parts 31, 32. The dividing plane T is thereby disposed at an angle α to a vertical axis X-X. The dividing plane T divides the holding unit 3 in the middle.

As can further be seen from FIG. 5, the first star wheel of the feed device 20 is disposed at an angle β to a horizontal plane E1 and is inherently designed conically. The first star wheel of the feed device 20 is arranged in a conveying plane E2. The angle β amounts thereby to half of the first angle α of the dividing plane T to the vertical axis X-X.

As can be seen in the FIGS. 1 to 3, the holding unit 3 is divided in the direction of a longitudinal axis L of the holding unit 3. The containers 5 are thus fed in the radial direction of the longitudinal axis L of the containers. As a result, the containers can be fed and discharged substantially in the standing position. The containers 5 are transferred and delivered to the holding unit 3 in a slightly inclined position due to the inclined arrangement of the first star wheel of the feed device 20. In so doing, a radial insertion movement into the open holding unit 3 can be facilitated. A first angle α between the longitudinal axis L' and the vertical axis X-X and the second angle β between the conveying plane E2 and the horizontal plane E1 or respectively between the axes X-X and Y-Y are selected in such a way that the container 5 inserted into the recess 35 cannot slip out of or tilt out of said recess even when a rotating movement of the rondel 2 occurs and thus can be fed without a further holding and supporting device when the holding unit 3 is still open.

A removal out of the rondel 2 by means of the removal device 21 likewise preferably occurs in an inclined position. Expellers or vacuum suction devices or the like can be used in this process. Due to the inclined arrangement, a removal can likewise only be facilitated using small forces because the entire mass of the container does not have to be held by, e.g., the force of the suction device but rather only a smaller portion of the weight as well as the frictional forces of the container to be overcome on the guide surfaces.

According to the invention, star wheels, which are very functionally stable and proven reliable, can furthermore be used so that a reliable operation of the testing device 1 is possible.

The closed holding unit 3 has as small a dead volume as possible so that a vacuum generation is possible with as little effort and cost as possible and a high measuring accuracy is achieved. It should be noted that only one of the holding parts 31, 32 is designed to pivot about the pivot shaft in this exemplary embodiment. It is, however, also possible for the other of the two holding parts to be designed to pivot or for the two holding parts 31, 32 to be designed to pivot about the pivot shaft 4.

A control device that is not shown is further provided, which controls an actuation of the closing and opening movement of the holding unit 3. The opening and/or closing of said holding unit can hereby be facilitated by means of a pneumatic drive or a cam-guided spigot guide or something similar. A sealing off of the two holding parts 31, 32 can, for example, result by means of an inserted O-ring.

Figure 6:
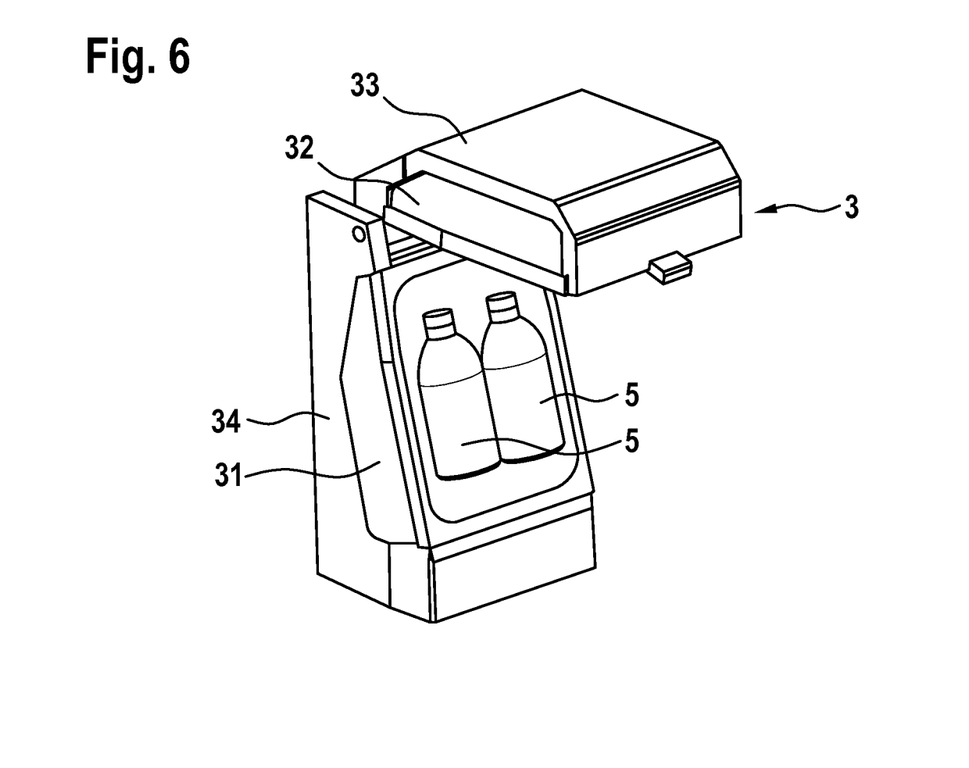
FIG. 6 shows a schematic, perspective depiction of a holding unit according to a second exemplary embodiment of the invention.

FIG. 6 shows a holding unit 3 of a second exemplary embodiment of a testing device 1. In contrast to the first exemplary embodiment, the holding unit 3 of the second exemplary embodiment has two recesses in order to accommodate two containers 5. It should be noted that the holding unit can also, of course, accommodate a plurality of containers 5. A higher degree of efficiency can thereby be facilitated when testing the containers 5 for leak tightness because a plurality of containers can be tested at the same time. Otherwise this exemplary embodiment corresponds to the preceding exemplary embodiment so that reference can be made to the description given there.

A testing device 1 according to a third exemplary embodiment of the invention is described below in detail with reference to the FIGS. 7 to 9.

Figure 7:
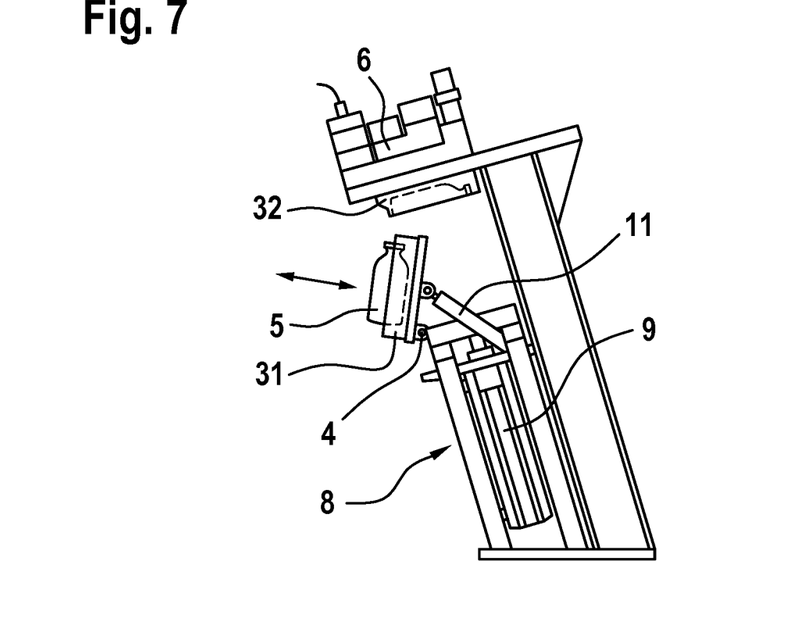
FIGS. 7 to 9 show schematic side views of a testing device according to a third exemplary embodiment of the invention.
Figure 8:
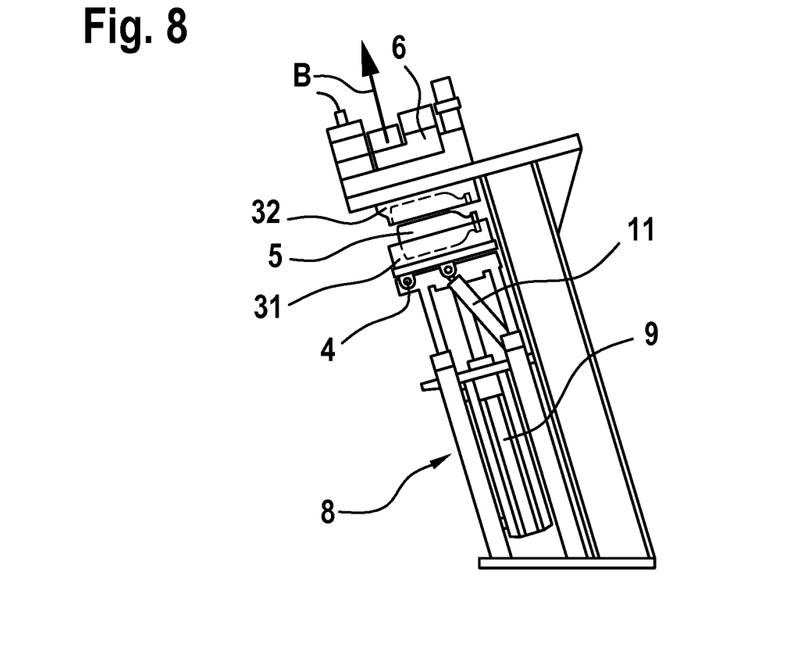
Figure 9:
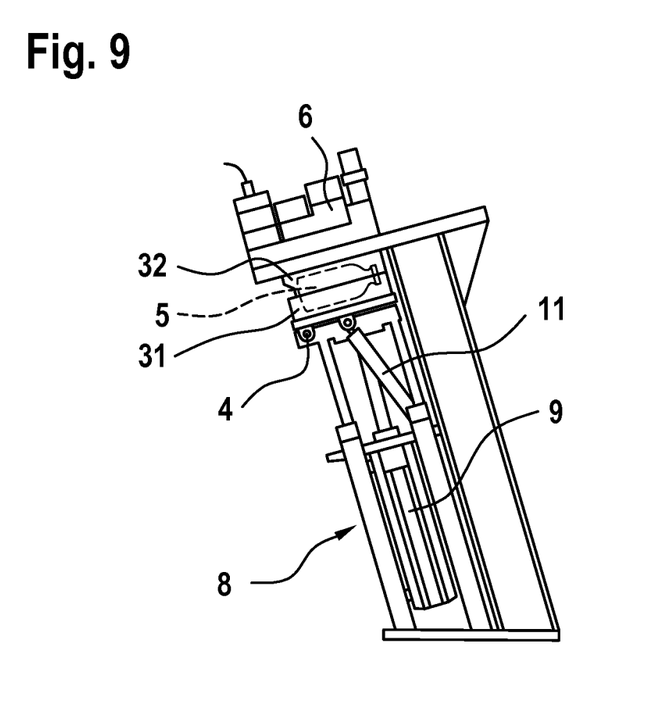

As can be seen in the FIGS. 7 to 9, the first holding part 31, in which the container 5 to be checked is inserted, is movable and the second holding part 32 cannot be moved relatively to the first holding part 31 in the third exemplary embodiment. A pivot shaft 4 is provided on the first holding part 31. As can be seen from the sequence of the FIGS. 7 to 9, the container 5 is first inserted in the recess and is first pivoted about the pivot shaft 4 by means of a lifting/pivoting device 8 and then moved linearly in the direction of arrow B (cf. FIG. 8) until the holding unit 3 is closed (FIG. 9). The lifting/pivoting device 8 has a drive 9 which is disposed beneath the first holding part 31.

A reversal of the pivoting movement about the pivot shaft 4 with respect to the lifting movement occurs here by means of a spring-mounted coupling rod 11. The coupling rod 11 enables an exact control of the movement combination: pivoting and lifting, wherein only a single drive 9 is provided. In the same manner, the spring-mounted coupling rod 11 also acts conversely during lowering and opening of the holding unit 3. As can be seen in the FIGS. 7 to 9, the vacuum generation device 6 and the corresponding measuring devices are furthermore disposed on the immovable holding part 32.

The invention claimed is:

1. A testing device for checking leak tightness of containers, comprising:
a holding unit for holding at least one container, which holding unit has a first holding part and a second holding part,
wherein the holding unit is divided into the first and second holding parts in the direction of a longitudinal axis of the holding unit, and
wherein a pivot shaft for pivoting of at least one of the first and second holding parts is arranged on the first and/or the second holding part,
wherein the holding unit is divided in a dividing plane,
wherein the dividing plane is inclined at a first angle to an axis, the first angle being acute, and
wherein the holding unit is configured to be oriented in operation such that the axis extends vertically when the holding unit is placed on a horizontal surface.

2. The testing device according to claim 1, wherein the first angle is approximately 13 degrees.

3. The testing device according to claim 1, characterized in that the first holding part and the second holding part are connected to one another on the pivot shaft.

4. The testing device according to claim 3, characterized in that the pivot shaft is arranged at an end region of the holding unit.

5. The testing device according to claim 3, characterized in that only one of the first and second holding parts is movably arranged on the pivot shaft.

6. The testing device according to claim 1, further comprising a rondel on which the holding unit and at least one additional holding unit is arranged.

7. The testing device according to claim 1, further comprising a feed device having a star wheel, the star wheel comprising a conveying plane in which containers are conveyed and wherein the conveying plane is arranged at a second angle to a third plane and wherein the star wheel is configured to be oriented in operation such that the third plane extends horizontally when the holding unit is placed on a horizontal surface.

8. The testing device according to claim 7, characterized in that the second angle is half as large as the first angle.

9. The testing device according to claim 1, further comprising a lifting/pivoting device which is connected to one of the first and second holding parts in order to close and to open the holding unit.

10. The testing device according to claim 1, characterized in that the holding unit has at least one recess for holding the container, the recess having a recess longitudinal axis which is parallel to the longitudinal axis of the holding unit.

11. The testing device according to claim 1, further comprising a feed device having a star wheel, the star wheel comprising a conveying plane in which containers are conveyed, wherein the conveying plane is arranged at a second angle to a third plane, wherein the star wheel is configured to be oriented in operation such that the third plane extends horizontally when the holding unit is placed on a horizontal surface and wherein the star wheel is conical.

12. A method for feeding containers to be checked for leak tightness to a testing device, the testing device having at least one holding unit comprising a first and second holding part, wherein the holding unit is divided into the first and second holding parts in the direction of a longitudinal axis of the holding unit, wherein a pivot shaft for pivoting of at least one of the first and second holding parts is arranged on the first and/or the second holding part, and wherein the holding unit is divided in a dividing plane, the method comprising the following steps:
positioning the holding unit such that the dividing plane is inclined at a first angle to a vertical axis, the first angle being less than 45 degrees,
feeding a container to the holding unit when the holding unit is in an open state; and
inserting the container into the holding unit in the open state, wherein the container is positioned in an inclined position at the first angle to the vertical axis and is inserted in the inclined position into a recess in the first holding part.

13. The method according to claim 12, wherein the first angle is approximately 13 degrees.

* * * * *